United States Patent
Papadias et al.

(10) Patent No.: US 7,184,488 B2
(45) Date of Patent: Feb. 27, 2007

(54) QUASI-ORTHOGONAL SPACE-TIME CODES

(75) Inventors: Constantinos B Papadias, Westfield, NJ (US); Naresh Sharma, Budd Lake, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 790 days.

(21) Appl. No.: 10/099,515

(22) Filed: Mar. 15, 2002

(65) Prior Publication Data

US 2003/0174782 A1  Sep. 18, 2003

(51) Int. Cl.
*H04L 27/00* (2006.01)
(52) U.S. Cl. .................................................. 375/295
(58) Field of Classification Search .............. 375/295, 375/296, 299
See application file for complete search history.

(56) References Cited

U.S. PATENT DOCUMENTS

| | | | | |
|---|---|---|---|---|
| 5,822,318 A | * | 10/1998 | Tiedemann et al. | 370/391 |
| 5,832,044 A | * | 11/1998 | Sousa et al. | 375/347 |
| 5,995,551 A | * | 11/1999 | McCallister et al. | 375/265 |
| 6,115,427 A | * | 9/2000 | Calderbank et al. | 375/267 |
| 6,804,307 B1 | * | 10/2004 | Popovic | 375/299 |
| 6,914,934 B1 | * | 7/2005 | Lou et al. | 375/229 |
| 7,050,510 B2 | * | 5/2006 | Foschini et al. | 375/299 |
| 2003/0067993 A1 | * | 4/2003 | Viswanathan | 375/267 |

OTHER PUBLICATIONS

U.S. Appl. No. 09/752,637, filed Dec. 29, 2000, Foschini et al.

* cited by examiner

*Primary Examiner*—Kevin Burd
(74) *Attorney, Agent, or Firm*—Irena Rappaport (57) ABSTRACT

A method and apparatus for reducing the bit rate of multi-input systems that employ space-time coding by displacing in signal space the derivatives of a symbol. A mapped particular symbol is space-time coded to generate transmit-sequences having a phase-shifted version of the particular symbol, the phase-shifted version and the particular symbol differing in phase by an amount other than by 90°, 180°, and 270°. In one embodiment, the particular symbol represents a point in a first symbol constellation and the derivatives of the particular symbol represent points in a displaced symbol constellation. In another embodiment, the particular symbol and another symbol are space-time coded to form the transmit-sequences. The derivatives of the particular symbol represent points in a first symbol constellation and derivatives of the other symbol represent points of a second symbol constellation. The two constellations are displaced versions of each other. The displacement can be a phase shift and/or a change in amplitude. Illustratively, the two symbols are ones whose received versions interfere with each other after the two transmit-sequences are space-time decoded at the receiver. Displacing the derivatives of symbols reduces the bit error rate and thus increases the capacity of the system. Particularly, such a displacement increases the distance between symbols of a constellation whose points represent the combination of the derivatives of two the symbols.

19 Claims, 8 Drawing Sheets

FIG. 4
TABLE 1

| $b_1$'s ASSOCIATED SYMBOL CONSTELLATION | $b_2$'s ASSOCIATED SYMBOL CONSTELLATION | $b_3$'s ASSOCIATED SYMBOL CONSTELLATION | $b_4$'s ASSOCIATED SYMBOL CONSTELLATION |
|---|---|---|---|
| PHASE SHIFTED | NOT-PHASE SHIFTED | NOT-PHASE SHIFTED | NOT-PHASE SHIFTED |
| NOT-PHASE SHIFTED | PHASE SHIFTED | NOT-PHASE SHIFTED | NOT-PHASE SHIFTED |
| NOT-PHASE SHIFTED | NOT-PHASE SHIFTED | PHASE SHIFTED | NOT-PHASE SHIFTED |
| NOT-PHASE SHIFTED | NOT-PHASE SHIFTED | NOT-PHASE SHIFTED | PHASE SHIFTED |
| PHASE SHIFTED BY THE SAME AMOUNT AS $b_2$'s ASSOCIATED CONSTELLATION | PHASE SHIFTED BY THE SAME AMOUNT AS $b_1$'s ASSOCIATED CONSTELLATION | | |
| PHASE SHIFTED BY A DIFFERENT AMOUNT THAN $b_2$'s ASSOCIATED CONSTELLATION | PHASE SHIFTED BY A DIFFERENT AMOUNT THAN $b_1$'s ASSOCIATED CONSTELLATION | NOT-PHASE SHIFTED | NOT-PHASE SHIFTED |
| NOT-PHASE SHIFTED | NOT-PHASE SHIFTED | PHASE SHIFTED BY THE SAME AMOUNT AS $b_4$'s ASSOCIATED CONSTELLATION | PHASE SHIFTED BY THE SAME AMOUNT AS $b_3$'s ASSOCIATED CONSTELLATION |
| NOT-PHASE SHIFTED | NOT-PHASE SHIFTED | PHASE SHIFTED BY A DIFFERENT AMOUNT THAN $b_4$'s ASSOCIATED CONSTELLATION | PHASE SHIFTED BY A DIFFERENT AMOUNT THAN $b_3$'s ASSOCIATED CONSTELLATION |
| PHASE SHIFTED BY THE SAME AMOUNT AS $b_2$'s ASSOCIATED CONSTELLATION AND BY A DIFFERENT AMOUNT THAN $b_3$'s ASSOCIATED CONSTELLATION | PHASE SHIFTED BY THE SAME AMOUNT AS $b_1$'s ASSOCIATED CONSTELLATION AND BY A DIFFERENT AMOUNT THAN $b_4$'s ASSOCIATED CONSTELLATION | PHASE SHIFTED BY THE SAME AMOUNT AS $b_4$'s ASSOCIATED CONSTELLATION AND BY A DIFFERENT AMOUNT THAN $b_1$'s ASSOCIATED CONSTELLATION | PHASE SHIFTED BY THE SAME AMOUNT AS $b_3$'s ASSOCIATED CONSTELLATION AND BY A DIFFERENT AMOUNT THAN $b_2$'s ASSOCIATED CONSTELLATION |
| PHASE SHIFTED BY DIFFERENT AMOUNTS THAN $b_2$'s, $b_3$'s AND $b_4$'s ASSOCIATED CONSTELLATIONS | PHASE SHIFTED BY DIFFERENT AMOUNTS THAN $b_1$'s, $b_3$'s AND $b_4$'s ASSOCIATED CONSTELLATIONS | PHASE SHIFTED BY DIFFERENT AMOUNTS THAN $b_1$'s, $b_2$'s AND $b_4$'s ASSOCIATED CONSTELLATIONS | PHASE SHIFTED BY DIFFERENT AMOUNTS THAN $b_1$'s, $b_2$'s AND $b_3$'s ASSOCIATED CONSTELLATIONS |

QUASI-ORTHOGONAL SPACE-TIME CODES

BACKGROUND OF THE INVENTION

This invention relates to wireless communication systems, and more particularly, to wireless communication systems using multiple antennas at the transmitter and one or more antennas at the receiver.

Wireless communication systems that use multiple antennas at the transmitter are commonly referred to as multiple-input systems. Space-time coding can be used in multiple-input systems to reduce the power needed to transmit information at a particular information data rate and still maintain a certain error rate. Similarly, space-time coding can be used to increase the information data rate at a particular power lever and still maintain a certain error rate, or to reduce the error rate at a particular information data rate and power level.

Additionally, it is highly advantageous to employ channel coding in order to approach the maximum open loop capacity of a multiple-input system. (An open loop system is one where channel characteristics are not fed back to the transmitter.) As channel coding improves, the system approaches the maximum open loop capacity. Thus, it is desirable to employ such channel coding in a multiple-input system. The state-of-the-art channel codes, e.g., Turbo codes, trellis codes and the like, are typically spatially one dimensional, i.e., they are designed for only a single transmit antenna. Particular types of space-time coding allow the use of such channel codes in multiple-input systems. Such space-time coding involves reducing interference between concurrently transmitted symbols.

Typically, in a transmitter that uses both channel coding and space time coding, a primitive data stream—the data stream to be transmitted—is divided into data sub-streams, each of which is channel coded, and each encoded sub-stream is mapped into symbol space to produce symbol sub-streams. One or more of the symbol sub-streams are then space-time coded to form space-time coded symbol sub-streams. In some space-time coding schemes, each transmit antenna transmits transmit-sequences formed from the symbols of one or more symbol sub-streams. The transmit-sequences are one or more symbol periods in duration. This duration is commonly referred to as the length of the transmit-sequence. A plurality of transmit-sequences that are to be transmitted by the same antenna form the space-time-coded symbol sub-streams.

SUMMARY OF THE INVENTION

The present inventors have recognized that it is possible to reduce the bit error rate of multiple-input systems that employ space-time coding by displacing in signal space the input derivatives of at least one of the symbols in at least one transmit-sequence. The input derivatives are the symbol, a 90° phase-shifted version of the symbol, or a 180° phase-shifted version of the symbol, and a 270° phase-shifted version the symbols. According to the invention, one or more bits of a primary data stream are mapped into a particular symbol. The particular symbol is space-time coded to generate one or more transmit-sequences having at least one phase-shifted version of the particular symbol, the phase-shifted version having a phase that differs from the particular symbol by a phase of other than 90°, 180°, and 270°.

In one embodiment of the invention, the particular symbol represents a point in a first symbol constellation and all of the output derivatives of the particular symbol represent points in a displaced symbol constellation. The displacement can be, for example, a phase shift, a change in amplitude, or a combination of these. The output derivatives are either the input derivatives or a processed, for example phase-shifted, version of the input derivatives that are used in the transmit sequences.

In another embodiment of the invention, the particular symbol and another symbol are space-time coded to form the transmit-sequences. The output derivatives of the particular symbol represent points in a first symbol constellation and output derivatives of the other symbols represent points of a second symbol constellation. The first symbol constellation is a displaced version of the second symbol constellation. The displacement can be, for example, as described above a phase shift and/or a change in amplitude. Furthermore in this case the two symbol constellations can be different symbol constellations and the displacement of one with respect to the other is a difference in the rotations in the complex plane of the two different symbol constellations.

In an illustrative embodiment of the invention, the two symbols, i.e. the particular symbol and the other symbol, are ones whose received versions interfere with each other after they are space-time decoded. In this case, the displacement is a function of the space-time code used to reduce the interference between the symbols. In particular, the displacement can be used to reduce interference between symbols that are obtained after the portion of the received signals that contains the two transmit-sequences is demultiplexed at the receiver. Illustratively, the space-time coding can be such that at the receiver a pair of space-time decoded symbols interfere with each other, but other space-time decoded symbols do not interfere with this pair. In this case, the output derivatives of one of these symbols represent points in the first constellation and the output derivatives of the other of these symbols represent points in a second constellation.

Advantageously, displacing in signal space the output derivatives of at least one of the symbols in the transmit-sequences reduces the bit error rate and thus increases the bit rate of the system. In particular, such a displacement increases the distance between symbols of a combination constellation whose points represent the combination of the output derivatives of the two symbols.

BRIEF DESCRIPTION OF THE DRAWING

FIG. 4 is a table illustrating possible combinations of symbol constellation when the transmit-sequences are formed from two pairs of symbols, where the symbols in a particular pair interfere with each other;

The figures are not drawn to scale and illustrate the interconnectivity of the depicted systems and not necessarily their spatial layout and physical dimensions.

DETAILED DESCRIPTION

As described above, it is desirable to employ channel codes in a multiple-input system. Particular types of space-time coding allow the use of such channel codes in multiple-input systems. Such space-time coding reduces the interference between the symbols. For example, one technique employing channel coding in a four-transmit-antenna system that employs conventional channel coding uses a so-called decoupled space-time coding approach, described in more detail in, U.S. Pat. No. 7,050,510, filed on Dec. 29, 2000, entitled "Open-Loop Diversity Technique For Systems Employing Four Transmitter Antennas", referred to herein as Foschini, incorporated herein by this reference.

Figure 1:
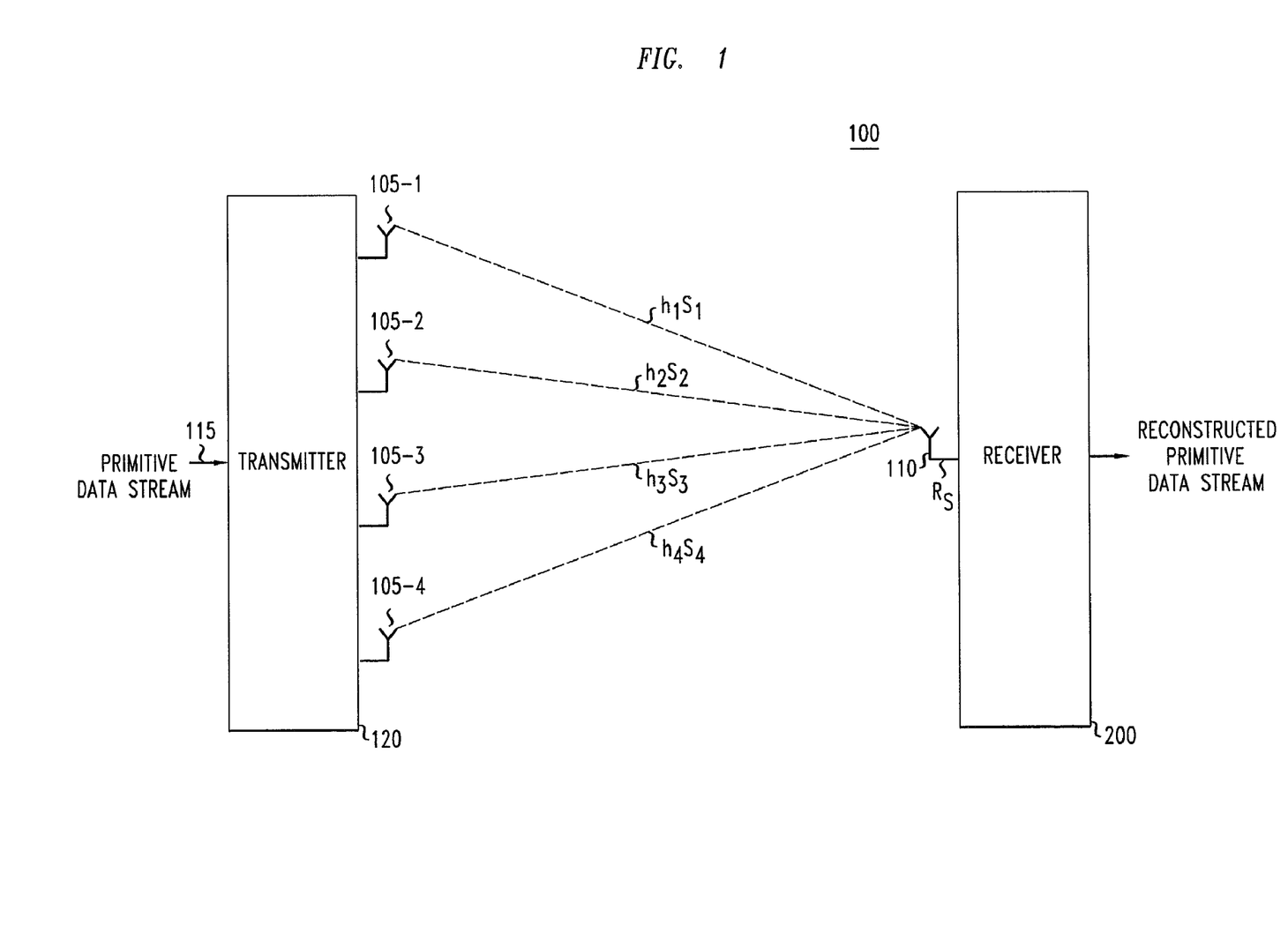
FIG. 1 illustrates a portion of a multiple-input wireless communication system.

FIG. 1 illustrates multiple-input wireless communication system 100 having four transmit antennas 105-1, 105-2, 105-3 and 105-4, and one receive antenna 110. In system 100, primitive data stream 115 is supplied to transmitter 120.

Typically, as described above in a transmitter that uses both channel coding and space time coding, such as for example one that can be used in Foschini, a primitive data stream is processed to form transmit-sequences. Typically, the transmit-sequences are made-up of a finite number of symbols. Often the number of symbols is the same as the number of transmit antennas. For example, in equation (1) the transmit-sequence that corresponds to antenna 105-1 is $b_1, b_2^*, b_3,$ and $b_4^*$ and it is four symbol periods in duration. A plurality of transmit-sequences that are to be transmitted by the same antenna form the space-time-coded symbol sub-streams. For example in Foschini, the transmit-sequences are four time periods long and in one embodiment can be arranged in a matrix B as follows:

$$\begin{array}{cccc} T_1 & T_2 & T_3 & T_4 \end{array} \quad (1)$$

$$\begin{array}{c} \text{Antenna } 105\text{-}1 \\ \text{Antenna } 105\text{-}2 \\ \text{Antenna } 105\text{-}3 \\ \text{Antenna } 105\text{-}4 \end{array} \begin{bmatrix} b_1 & b_2^* & b_3 & b_4^* \\ b_2 & -b_1^* & -b_4 & b_3^* \\ b_3 & b_4^* & -b_1 & -b_2^* \\ b_4 & -b_3^* & b_2 & -b_1^* \end{bmatrix},$$

where $b_1, b_2, b_3,$ and $b_4$ are the symbols, and $b_1^*, b_2^*, b_3^*,$ and $b_4^*$ are, respectively, the complex conjugates of the aforementioned symbols. The rows of the matrix represent the different transmit-sequences, while the columns represent different symbol periods ($T_i$, i=1 . . . 4).

The present inventors have recognized that it is possible to reduce the bit error rate of multiple-input systems that employ space-time coding by displacing in signal space the input derivatives of at least one of the symbols in at least one transmit-sequence. An input derivative of a symbols can be the symbol, a 90° phase-shifted version of the symbol, or a 180° phase-shifted version of the symbol, and a 270° phase-shifted version the symbols. For example the input derivatives of $b_1$ are $b_1$ or $-b_1$ or $b_1^*$ or $-b_1^*$. An output derivative of this symbol can be the input derivative of this symbol, or a phase-shifted input derivative, where the phase-shift is other than 90°, 180°, and 270°. The output derivatives of a symbols are all of the representation of the symbols in the transmit sequences. For example, all representations of $b_1$ in the transmit sequences are output derivatives of $b_1$, this is so whether the representations of $b_1$ are just the input derivatives or they are displaced versions of the input derivatives.

Figure 2A:
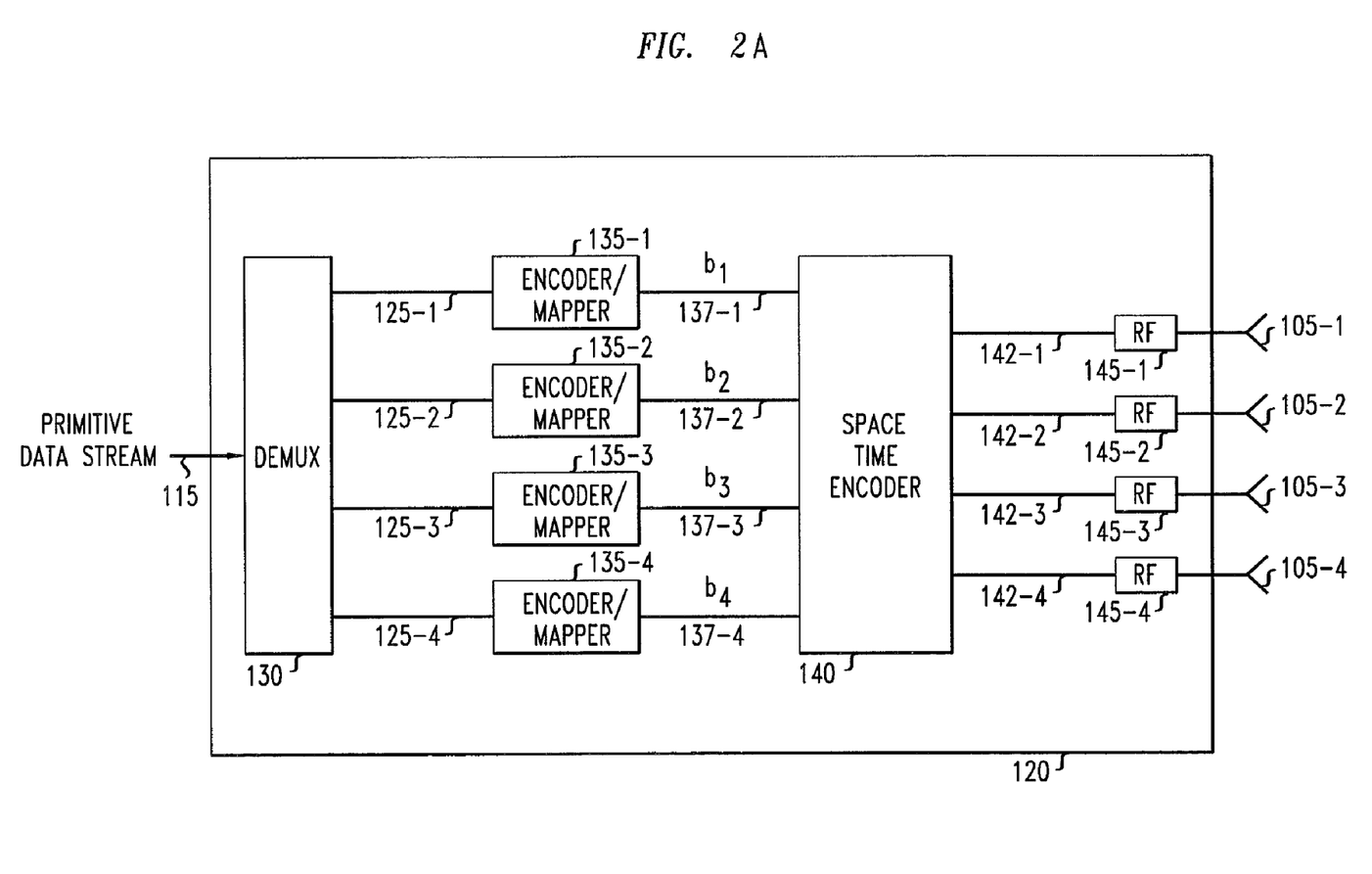
FIG. 2A illustrates in more detail a transmitter arranged in accordance with the principles of the invention.

FIG. 2A shows, in more detail, transmitter 120 arranged in accordance with an illustrative embodiment of the invention where derivatives of a symbol are phase-shifted. In transmitter 120, primitive data stream 115 is divided into a plurality of data sub-streams 125-1, 125-2, 125-3, and 125-4 typically by demultiplexing primitive data stream 115 in demultiplexer 130. (Typically, although not-necessarily, the number of sub-streams equals the number of transmit antennas.)

The sub-streams are then channel coded and mapped to a symbol constellation, with each sub-stream coded and mapped in a respective one of the encoder/mappers 135-1, 135-2, 135-3, and 135-4 to produce symbol sub-streams 137-1, 137-2, 137-3, and 137-4. Advantageously, encoder/mappers 135-1, 135-2, 135-3, and 135-4 may employ conventional channel coding, such as Turbo coding. The channel coding of each data sub-stream may be independent of the channel coding of the other data sub-streams.

Encoder/mappers 135-1, 135-2, 135-3, and 135-4 also map the channel coded bits of their respective sub-streams to a discrete alphabet or modulation symbol constellation, thus mapping the channel coded bits into symbol space. The outputs of encoder/mappers 135-1, 135-2, 135-3, and 135-4 are encoded symbols, referred to herein simply as symbols or as input symbols, the latter because they will be the input to the space-time encoder. In particular symbols $b_1, b_2, b_3,$ and $b_4$ are the respective outputs of encoder/mappers 135-1, 135-2, 135-3, and 135-4. Symbols are a result of mapping the bits of the channel-coded sub-streams into symbol space by mapping a one or more of bits to points of symbol constellations. The symbol sub-streams are made up of the symbols that correspond to the bits of respective sub-streams. (Note, that if the sub-streams are not channel-coded, that is transmitter 120 uses mappers instead of the encoder/mappers, then symbols are a result of mapping the bits of the non-encoded sub-streams into symbol space.) The time duration of a symbol is referred to as a symbol period.

The symbols are then space-time coded in space-time encoder 140. As described above, the space time coding should be such that the output derivatives at least one of the symbols are displaced in signal space. In one embodiment of the invention, space-time encoder 140 forms the transmit-sequences by selecting already phase-shifted output derivatives of one of the symbols, for example $b_1$. The output derivatives differ from $b_1$ by a phase of other than 90°, 180°, and 270°. That is, the output derivatives $b_1$ differ from $b_1$ as it is produced by encoder/mapper 135-1. Thus, $b_1$ represents a point in a first symbol constellation and the output derivatives of $b_1$ represent points in a second symbol constellation, where the second symbol constellation is a phase-shifted version of the first symbol constellation. This phase shift can be any amount other than 90°, 180°, and 270°. Preferably the symbols whose output derivatives should differ from the symbol by this phase shift, and the amount of the phase-shift, are ones where introducing this phase-shift would reduce the interference between symbols after space-time decoding at the receiver, for example, as described below.

Space-time encoder 140 can use the space-time coding approach used by the space-time encoder to produce transmit matrix B shown in (1) above, except the output derivatives of $b_1$ are phase shifted versions of its input derivatives. Similarly, the phase-shifted versions of the input derivatives of several symbols, such as $b_1$ and $b_2$, or of all of the symbols can be used in the transmit-sequences. The difference in phase between a particular symbol and one its phase-shifted output derivatives can be the same as the difference in phase between another symbol and one of its phase-shifted output-derivatives. In the case where phase-shifted output derivatives of bland phase-shifted output derivatives of $b_2$ are used in the transmit-sequences, the resulting transmit-sequences can be represented by transmit matrix B' as follows:

$$\begin{array}{c} \quad\quad T_1 \quad T_2 \quad T_3 \quad T_4 \\ \text{Antenna } 105\text{-}1 \\ \text{Antenna } 105\text{-}2 \\ \text{Antenna } 105\text{-}3 \\ \text{Antenna } 105\text{-}4 \end{array} \begin{bmatrix} b'_1 & b''^*_2 & b_3 & b^*_4 \\ b'_2 & -b''^*_1 & -b_4 & b^*_3 \\ b_3 & b^*_4 & -b'_1 & -b''^*_2 \\ b_4 & -b^*_3 & b'_2 & -b''^*_1 \end{bmatrix}, \quad (2)$$

where $b_3^*$ and $b_4^*$ are, respectively, complex conjugates of $b_3$ and $b_4$, $b_1'$ and $b_2'$ are, respectively, phase-shifted versions of $b_1$ and $b_2$, and $b_1^{*'}$ and $b_2^{*'}$ are, respectively, phase-shifted versions of the complex conjugates of $b_1$ and $b_2$. The rows of the matrix represent the different transmit-sequences, while the columns represent different symbol periods ($T_i$, i=1 . . . 4).

Figure 5:
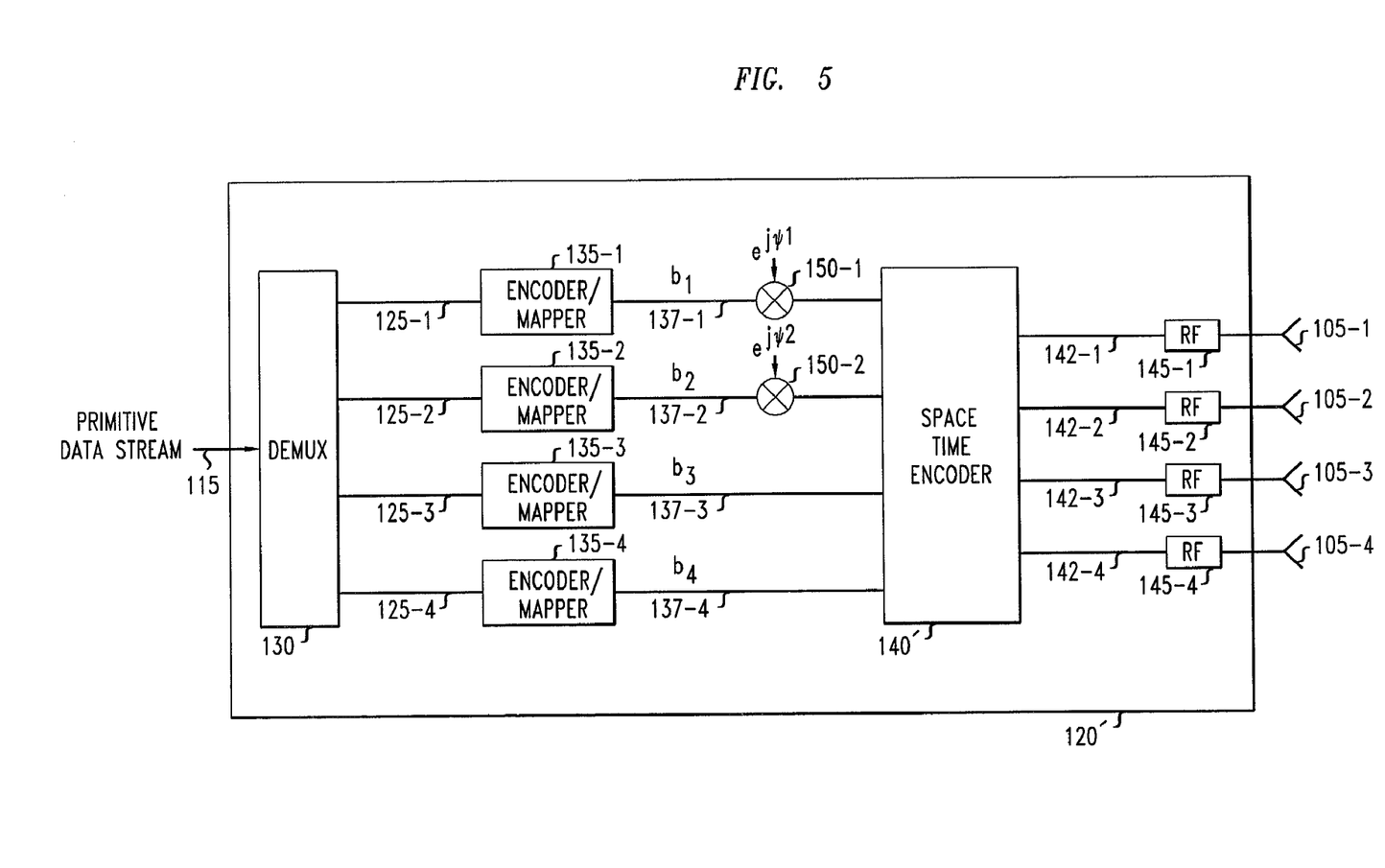
FIG. 5 illustrates in more detail another transmitter arranged in accordance with the principles of the invention.
Figure 6:
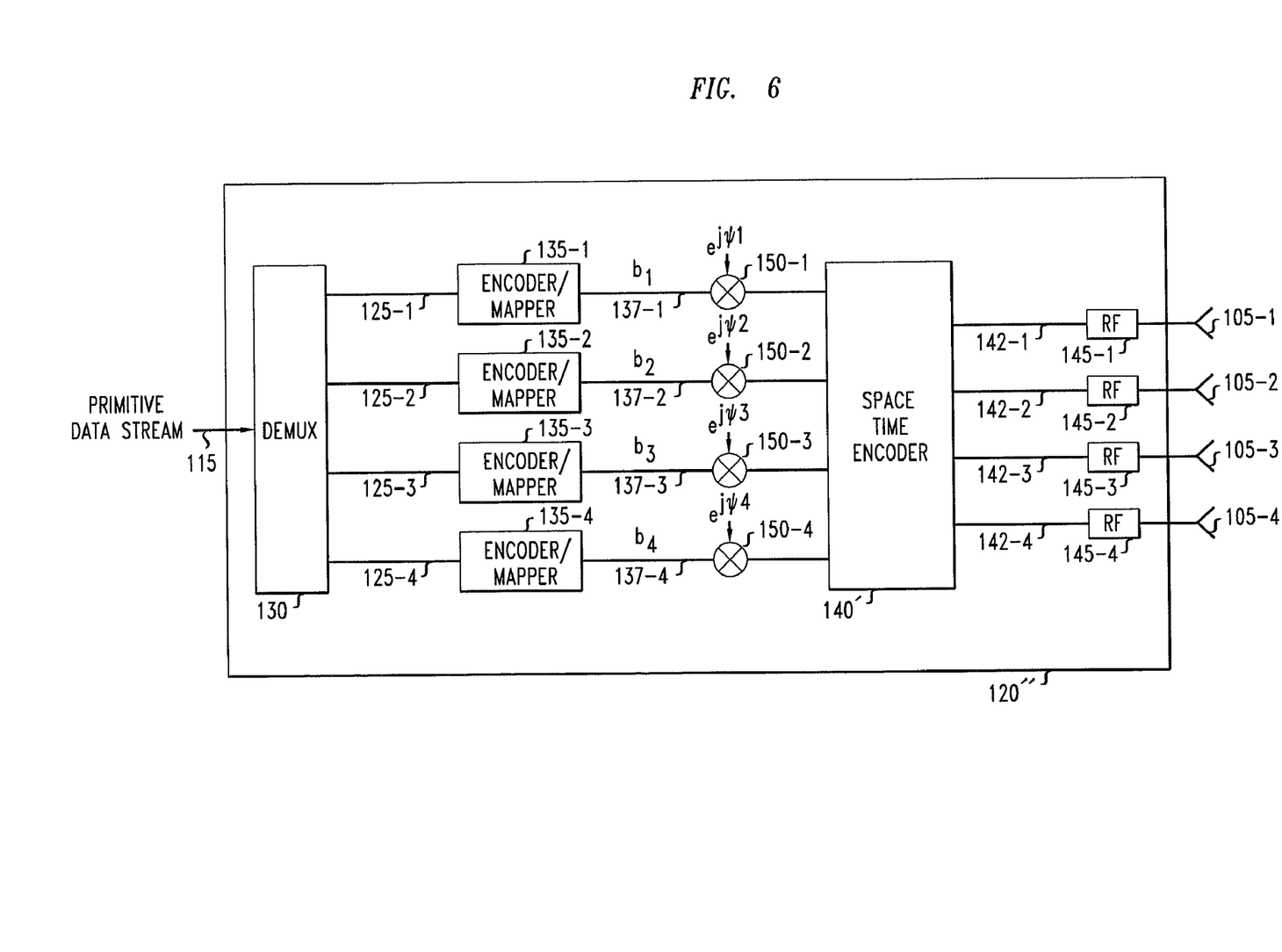
FIG. 6 illustrates in more detail yet another transmitter arranged in accordance with the principles of the invention.

Alternatively, a symbol, such as $b_1$, or several symbols, such as $b_1$ and $b_2$, can be phase shifted in the space-time encoder prior to the space-time encoding, or the symbols can be phase shifted prior to entering the space-time encoder. For example, transmitter 120', shown in FIG. 5, can operate as described above for transmitter 120 or as described below for transmitter 120''', except symbols, $b_1$ and $b_2$ are phase-shifted by subjecting $b_1$ and $b_2$ to phase shifts, $e^{j\psi 1}$ and $e^{j\psi 2}$, respectively, in multipliers 150-1 and 150-2, respectively. The phase-shifted and non-phase-shifted symbols are then encoded in space-time encoder 140'. The phase shifts, $e^{j\psi 1}$ and $e^{j\psi 2}$, respectively, can be the same or they can be different. Similarly, transmitter 120'', shown in FIG. 6, can operate as described above for transmitter 120 or as described below for transmitter 120''', except all four symbols, $b_1$, $b_2$, $b_3$, and $b_4$ are phase-shifted prior to being encoded in space-time encoder 140'.

Figure 2B:
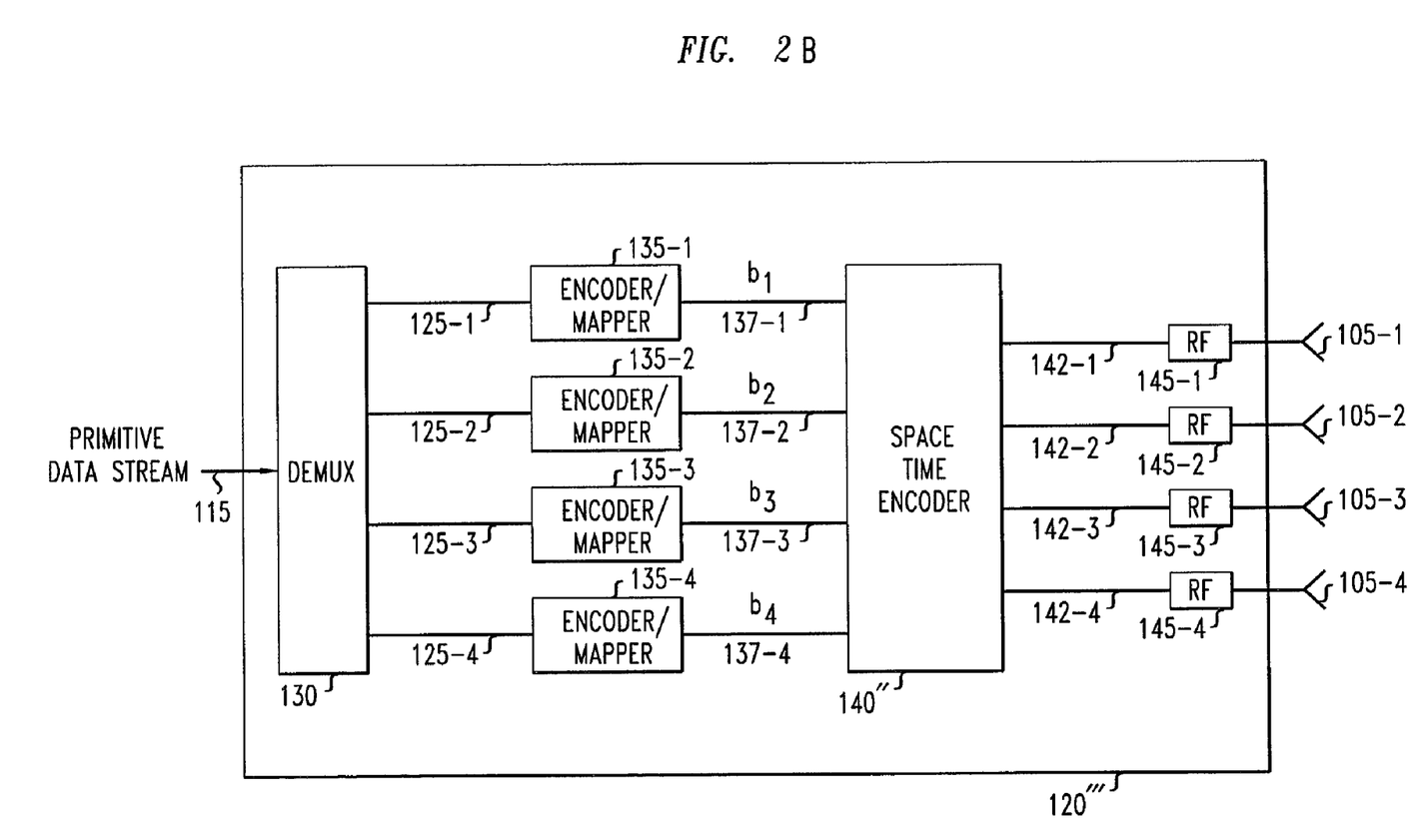
FIG. 2B illustrates in more detail another transmitter arranged in accordance with the principles of the invention.
Figure 3A:
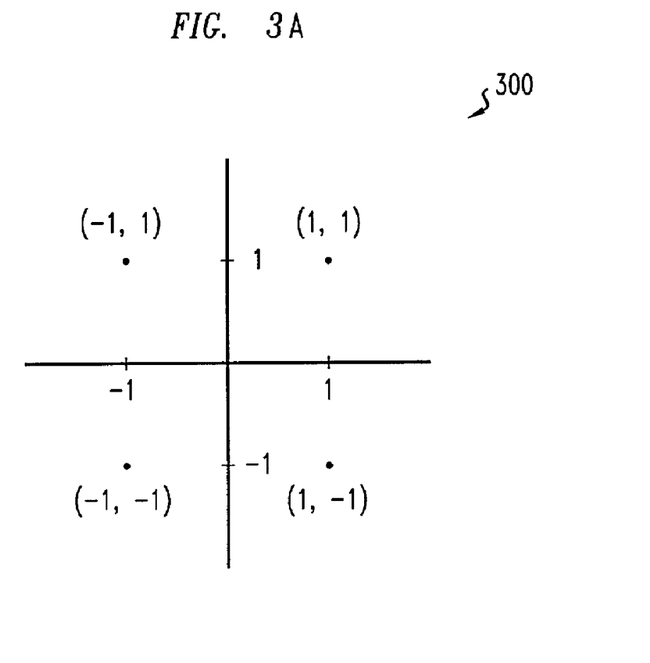
FIG. 3A illustrates a symbol constellation.
Figure 3B:
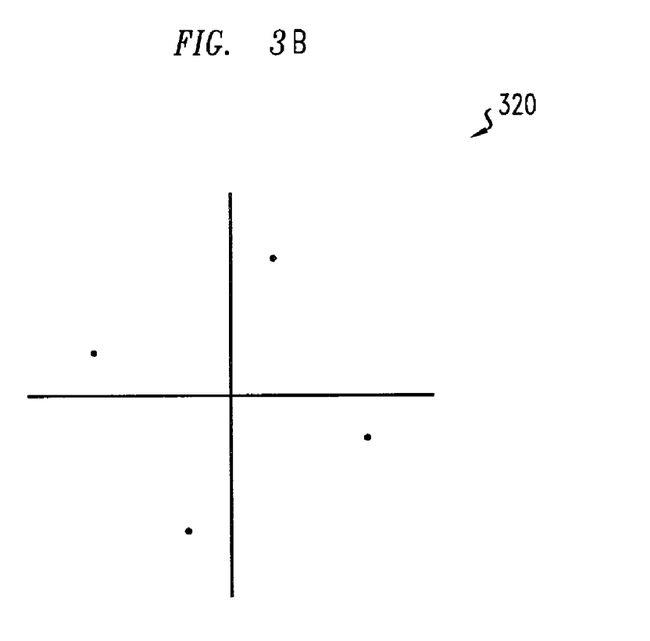
FIG. 3B illustrates a phase-shifted version of the symbol constellation of FIG. 3A.

In another embodiment of the invention, two symbols are space-time coded to form the transmit-sequences. The output derivatives of the particular symbol represent points in a first symbol constellation and output derivatives of the other symbols represent points of a second symbol constellation, where the two symbol constellations are a displaced versions of each other. The displacement can be, for example, as described above a phase shift and/or a change in amplitude. Furthermore in this case the two symbol constellations can be different symbol constellations and the displacement of one with respect to the other is a difference in the rotations in the complex plane of the two different symbol constellations. The just described can be accomplished by a space-time encoder 140'' of transmitter 120''' shown in FIG. 2B. In this illustrative embodiment, as in the above illustrative embodiment the displacement is a phase-shift. Transmitter 120''' operates as described above for transmitter 120, except space-time encoder 140'' selects the output derivatives of each of one symbols from a symbol constellations and the derivatives of another symbol from another symbol constellation, where the two constellations are phase-shifted versions of each other. FIG. 3A shows a sample QPSK symbol constellation, where one of four values (1,1), (1,−1), (−1,1) and (−1, −1) can be represented by a symbol. FIG. 3B shows a phase-shifted version of the symbol constellation shown in FIG. 3A. As can be seen from FIGS. 3A and 3B, every point in symbol constellation 320 is a phase-shifted version of the point in symbol constellation 300. Preferably, each of the points in the symbol constellation is displaced in the same manner, such as for example by phase shifting each symbol of the transmit-sequence by the same phase-shift.

The symbols whose associated constellations should be phase-shifted versions of each other are selected to be the symbols whose received versions interfere with each other at the receiver after their received version are space-time decoded. As will be explained in more detail below, using the space-time encoding described in Foschini, symbols $b_1$ and $b_3$ interfere with each other somewhat when they are space-time decoded at the receiver. Thus, the derivatives of $b_1$ represent points in a symbol constellation, such as the one shown in FIG. 3B, that is a phase-shifted version of the symbol constellation, such as the one shown in FIG. 3A, whose points are represented by the derivatives of $b_3$. Either the symbol constellation associated with (i.e. whose points are represented by the derivatives of) $b_1$ or $b_3$ can be phase-shifted, alternatively both symbol constellations can be phase-shifted by different amounts.

The amount by which one symbol constellation is a shifted version of the other can be any amount, although preferably it is the amount that would produce the biggest reduction in the interference between $b_1$ and $b_3$ at the receiver. The latter amount can be determined in any manner. For example, the amount can be determined empirically by generating (using either the actual system or a simulation of the system) a plurality of possible phase shifts between the two constellations and observing which phase shift produces the least amount of interference between $b_1$ and $b_3$ at the receiver. Alternatively, the amount of the phase shift can be determined by forming two combination constellations, one whose points represent every possible point of $b_1 + jb_3$ (that is every combination of every point of $b_1$ and every point of $b_3$), and the other's points represent every possible point of $b_1 - jb_3$. (Note, (Note, $j = \sqrt{-1}$.)

The minimum distances, $d_1$ and $d_2$, between the points of each combination constellation—that is the distance between closest points of the particular constellation—are determined and both of the minimum distances $d_1$ and $d_2$, (one for each constellation) is maximized as function of phase. This means that the two combination constellations are determined using a phase shifted version of one of the symbols, for example $b_1$, and this process is repeated using different phase shifts. As the phase shift changes the two minimum distances $d_1$ and $d_2$, change. Sometimes $d_1$ will be smaller and sometimes $d_2$ will be smaller. For example at a first phase shift, $d_1$ is 1 and $d_2$ is 2; at a second phase $d_1$ is 2 and $d_2$ is 1; at a third phase $d_1$ is 1.2 and $d_2$ is 1.6; and at a fourth phase $d_1$ is 1.8 and $d_2$ is 1.1. The desired phase is one that maximizes the smaller of the two minimum distances; that is the desired phase is one that produces the pair of minimum distances one having the largest value for that minimum distance and the other minimum distance having an even larger value. In the just described case the desired phase shift would be the third phase shift. Similarly to symbols $b_1$ and $b_3$, symbols $b_2$ and $b_4$ also interfere with each other somewhat when they are space-time decoded at the receiver. Thus, the output derivatives of $b_2$ and $b_4$ represent points of symbol constellations that are shifted versions of each other, where the amount of the shift can be determined in a similar manner as that described with reference to symbols $b_1$ and $b_3$.

Space-time encoder 140" processes the symbols to form four transmit-sequences by selecting the output derivatives of $b_1$ and $b_3$ from symbol constellations that are phase-shifted versions of each other and by selecting the output derivatives of $b_2$ and $b_4$ from symbol constellations that are phase-shifted versions of each other. (Note, the transmit-sequences that are to be transmitted on the same antenna 105-1, 105-2, 105-3, or 105-4 form one of the space-time-coded symbol sub-streams 142-1, 142-2, 142-3, or 142-4, respectively.) Like space-time encoder 140, space-time encoder 140" can use the space-time coding approach used by the space-time encoder used to produce transmit matrix B, except in the latter case the symbol constellations from which the output derivatives of $b_1$ and $b_3$ are selected are phase-shifted versions of each other, and the symbol constellations from which the derivatives of $b_2$ and $b_4$ are selected are phase-shifted versions of each other. In this case, when the symbol constellations from which the output derivatives of $b_1$ and $b_2$ are selected are phase-shifted, and the constellations from which the derivatives of $b_3$ and $b_4$ are selected are not phase shifted, the resulting transmit sequences can also be represented by transmit matrix B' shown in (2) above.

Similarly, if $b_3$'s associated constellation is phase-shifted instead of $b_1$'s associated constellation, the resulting transmission matrix B" would be as follows:

$$\begin{array}{c} \\ \text{Antenna } 105\text{-}1 \\ \text{Antenna } 105\text{-}2 \\ \text{Antenna } 105\text{-}3 \\ \text{Antenna } 105\text{-}4 \end{array} \begin{array}{cccc} T_1 & T_2 & T_3 & T_4 \\ \left[ \begin{array}{cccc} b_1 & b_2^{*\prime} & b_3' & b_4^* \\ b_2' & -b_1^* & -b_4 & b_3^{*\prime} \\ b_3' & b_4^* & -b_1 & -b_2^{*\prime} \\ b_4 & -b_3^{*\prime} & b_2' & -b_1^* \end{array} \right] \end{array}, \quad (3)$$

where $b_1^*$ and $b_4^*$ are, respectively, complex conjugates of $b_1$ and $b_4$, $b_3'$ and $b_2'$ are, respectively, phase-shifted versions of $b_3$ and $b_2$, and $b_3^{*\prime}$ and $b_2^{*\prime}$ are, respectively, phase-shifted versions of the complex conjugates of $b_3$ and $b_2$. The rows of the matrix represent the different transmit-sequences, while the columns represent different symbol periods ($T_i$, i=1 ... 4).

Additionally, as described above, both the constellation from which $b_1$ is selected and the constellation from which $b_3$ is selected can be phase shifted, but by different amounts. The relative amount of the phase shift between the two constellations can be determined as described above with respect to only one of the constellations being shifted. Often, it is the relative amount of the phase difference between the constellations from which $b_1$ and $b_3$ are selected that produces the reduction in interference between them at the receiver.

Table 1 lists the possible combinations of which symbol constellation can be phase-shifted when four symbols are used to form the transmit-sequences and the symbols interfere with each other in pairs, that is $b_1$ and $b_3$ interfere with each other, and $b_2$ and $b_4$ interfere with each other. Each of the combinations would produce a transmit matrix where for those symbols whose associated constellations are phase-shifted, the output derivatives are phase-shifted versions of the input derivatives of the symbol.

Thus, as can be seen from the above discussion, at least two symbols, $b_1$ and $b_3$ are space-time coded to form portions of at least two transmit-sequences of transmit matrix B'. Each transmit-sequence includes space-time coded symbols. The output derivatives of $b_1$ are points of a first symbol constellation. The output derivatives of $b_3$ are points of a second symbol constellation. The first symbol constellation is a displaced symbol constellation with respect to the second symbol constellation. In particular the first symbol constellation is a shifted version of the second symbol constellation.

In an alternative embodiment from the one just described where the space-time encoder selects the output derivatives of selected symbols from a phase shifted constellation, the space-time encoder can phase shift the symbols prior to the space-time encoding, or the symbols can be phase shifted prior to entering the space-time encoder, as described above, with respect to FIGS. 5 and 6. As described above, in transmitter 120', shown in FIG. 5, symbols, $b_1$ and $b_2$ are phase-shifted by subjecting $b_1$ and $b_2$ to phase shifts, $e^{j\psi_1}$ and $e^{j\psi_2}$, respectively, in multipliers 150-1 and 150-2, respectively. The amount of phase shifts between each of the pair of symbols, that is $b_1$ and $b_3$, and $b_2$ and $b_4$, respectively, can be determined in the same manner as described above with respect to determining the amount of the phase-shift between their respective constellations. Similarly, in transmitter 120", shown in FIG. 6, four symbols, $b_1$, $b_2$, $b_3$, and $b_4$ are phase-shifted prior to being encoded in space-time encoder 140'. In this case, the phase-shifts to which $b_1$ and $b_3$ are subjected are different from each other, and the phase-shifts to which $b_2$ and $b_4$ are subjected are different from each other. The possible combinations of phase shifts to which the symbols are subjected to is similar to that shown in Table 1, with each phase-shift in the table representing a multiplier, and the symbols phase shifted in the same manner as described with respect to their associated symbol constellation in Table 1.

Similarly to the embodiment where the space-time encoder selects the output derivatives of selected symbols from a phase shifted constellation, the just described embodiment of phase-shifting symbols and then space-time encoding them also produces output derivatives of the phase-shifted symbol that represent points in a first symbol constellation, and output derivatives of the not phase-shifted symbols that represent points in a second symbol constellation, where the first symbol constellation is a phase-shifted version of the second symbol constellation.

In both of the above embodiments, each of the transmit-sequences includes at least one derivative of each symbol, and the derivatives of a particular symbol are in different positions in the transmit-sequences. For example, the derivatives of $b_1$ are in the first, second, third, and fourth positions, respectively, in the first, second, third, and fourth transmit-sequences. Therefore, each of at least two of the transmit-sequences includes at least one space-time coded symbol from the first plurality and at least one space-time coded symbol from the second plurality. Additionally, one of the at least two transmit-sequences has a first order with the space-time coded symbols from the first plurality being in a particular position in the order and another of the at least two transmit-sequences has a second order. The position of the space-time coded symbols from the first plurality being different in the first order than the position of the space-time coded symbol from the first plurality in the second order.

Each of the transmit-sequences is supplied as an input to a respective one of radio frequency (RF) units 145-1, 145-2, 145-3, and 145-4. The radio frequency units perform all the necessary processing to convert their respective transmit-sequences from baseband to radio frequency modulated signals. The radio frequency modulated signal developed by one of the RF units 145-1, 145-2, 145-3, and 145-4, is supplied to a respective one of the transmit antennas 105-1, 105-2, 105-3, and 105-4 from which the signal is transmitted. Since each row of transmit matrix B' represents one transmit sequence, each row of transmit matrix B' corresponds to one of transmit antennas 105-1, 105-2, 105-3, and 105-4. More specifically, the elements of each row represent symbols that are emitted by the corresponding one of transmit antennas 105-1, 105-2, 105-3, and 105-4 in four symbol periods.

The signal path between a transmit and receive antenna is commonly referred to as a channel. The channels between each pair of transmit and receive antennas are shown in FIG. 1. Each channel has its own channel characteristic $h_i$, where i=1, 2, 3, 4 and $h_i$ represents the channel characteristic between the $i^{th}$ transmit antenna and the receive antenna. (The channel characteristic may also be referred to as a channel estimate or channel statistic.) Thus, the signal $h_iS_i$ on each channel is the transmitted signal from the channel's corresponding transmit antenna as modified by the channel characteristic.

Figure 7:
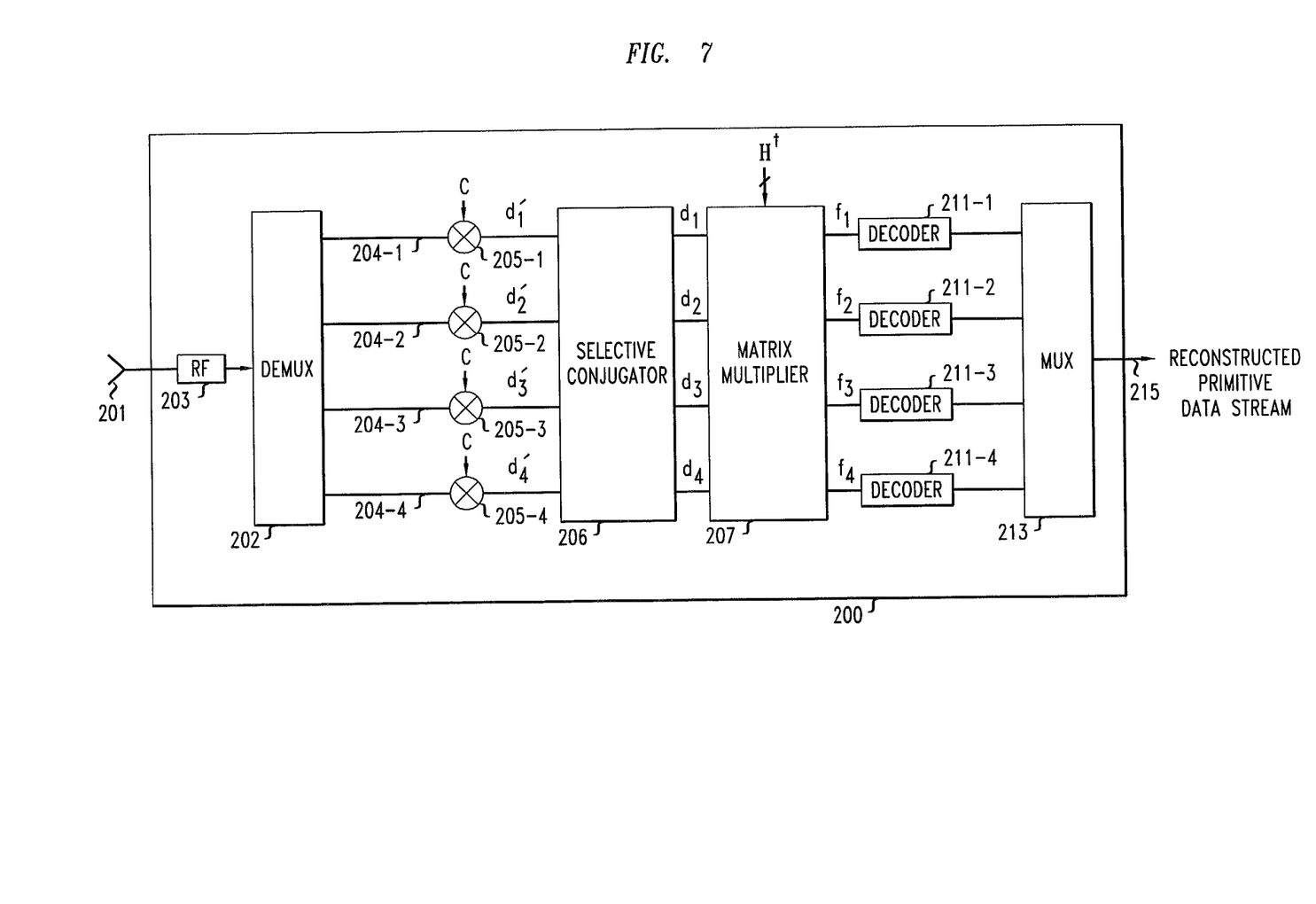
FIG. 7 illustrates in more detail a receiver arranged in accordance with the principles of one embodiment of the invention.

The transmitted signals $S_1$, $S_2$, $S_3$, and $S_4$, modified by the respective channel characteristics, arrive at the receive antenna 201. Thus, the received signal $R_S$ at the receive antenna is a superposition of the transmitted signals $S_1$, $S_2$, $S_3$, and $S_4$ as modified by the channel characteristics, plus noise $\eta$, making the receive antenna signal:

$$R_S = h_1S_1 + h_2S_2 + h_3S_3 + h_4S_4 + \eta \tag{4}$$

FIG. 7 shows, in more detail, an exemplary embodiment of receiver 200 arranged in accordance with the principles of the invention. Antenna 201 supplies an electrical version of the received signal to RF unit 203. RF unit 203 converts the radio frequency signal supplied to it by antenna 201 to a baseband version thereof.

The receiver is first described for the case where space-time coding is performed without the phase shifting, to illustrate a case where two symbols interfere with each other at the receiver after the space-time decoding. The receiver in accordance with the present invention will then be described.

The baseband signal provided by RF unit 203 is divided into four received symbol sub-streams 204-1, 204-2, 204-3, and 204-4 in demultiplexer 202. Demultiplexer 202 allocates the symbols received in one of four consecutive symbol periods to a different received symbol sub-stream. Demultiplexer 202 provides each of the received symbol sub-streams to a respective one of the correlators 205-1, 205-2, 205-3, and 205-4.

If the system uses direct sequence spreading, such as a code division multiple access (CDMA) system, each correlator 205 is supplied with an orthogonal spreading code sequence represented as a horizontal vector c. The orthogonal spreading code sequence c spans 1 symbol period and contains N chips, where N is the spreading gain. Thus, correlators 205 perform despreading, which is the inverse of the spreading (if any) performed in transmitter 120. Each correlator supplies a despread symbol sub-stream to selective conjugator 206. (If correlators 205 are not present, demultiplexer 202 provides the received symbol sub-streams directly to respective inputs of selective conjugator 206.)

Selective conjugator 206 determines the complex conjugate of any of the outputs $d_i'$ of correlators 205 that is being sought in the system of linear equations that describes the input to matrix multiplier 207. This system of linear equations is generally represented, when the channel is a flat-faded channel, as d=Hb+noise. d is the vertical vector that is the output of selective conjugator 206, b is a vertical vector formed from $b_1$, $b_2$, $b_3$, and $b_4$, and H is a matrix that is a function of channel characteristics $h_1$, $h_2$, $h_3$, and $h_4$ and matrix B. Note, H is the matrix derived from the channel characteristics where H maps a) the symbols of the symbol sub-streams prior to space-time coding to b) the received signals after the selective conjugator. H is the matrix of the channel characteristics if the space-time coding performed by space-time encoder 140 of FIG. 2A is considered part of the operation of the channel.

For example, when, as described hereinabove, matrix B is shown as matrix (1), then $$d = \begin{bmatrix} d_1 \\ d_2^* \\ d_3 \\ d_4^* \end{bmatrix} = \begin{bmatrix} h_1 & h_2 & h_3 & h_4 \\ -h_2^* & h_1^* & -h_4^* & h_3^* \\ -h_3 & h_4 & h_1 & -h_2 \\ -h_4^* & -h_3^* & h_2^* & h_1^* \end{bmatrix} \begin{bmatrix} b_1 \\ b_2 \\ b_3 \\ b_4 \end{bmatrix} + \begin{bmatrix} \eta_1 \\ \eta_2 \\ \eta_3 \\ \eta_4 \end{bmatrix}, \tag{5}$$

where $d_2^*$ and $d_4^*$ are the complex conjugates of $d_2$ and $d_4$, respectively.

Matrix multiplier 207 operates on the received vertical vector d to produce four match-filtered outputs. To this end, matrix multiplier 207 also receives, or derives, a 4×4 matrix $H^\dagger$, where $\dagger$ denotes complex conjugate transpose, also known as Hermitian transpose. As noted above, H, is the following matrix $$\begin{bmatrix} h_1 & h_2 & h_3 & h_4 \\ -h_2^* & h_1^* & -h_4^* & h_3^* \\ -h_3 & h_4 & h_1 & -h_2 \\ -h_4^* & -h_3^* & h_2^* & h_1^* \end{bmatrix} \tag{6}$$

thus $H^\dagger$ is $$\begin{bmatrix} h_1^* & -h_2 & -h_3^* & -h_4 \\ h_2^* & h_1 & h_4^* & -h_3 \\ h_3^* & -h_4 & h_1^* & h_2 \\ h_4^* & h_3 & -h_2^* & h_1 \end{bmatrix} \tag{7}$$

where, as described above, $h_i$ is the complex channel characteristic of the channel from the $i^{th}$ transmit antenna to the receiver antenna if the space-time coding performed by space-time encoder 140 of FIG. 2A is considered part of the operation of this channel and assuming all the channels are flat-faded. The matrix $H^\dagger$ multiplies from the left the 4×1 vertical vector d formed by the outputs of correlators 205 to produce a new 4×1 vertical vector f, i.e., $f=H^\dagger d$.

Note that H is not fully orthogonal, that is $H^\dagger H$, produces a matrix some of whose non-diagonal entries are not zero.

$$H^\dagger H = \begin{bmatrix} 2(|h_1|^2+|h_2|^2+|h_3|^2+|h_4|^2) & 0 & h_1^*h_3+h_2h_4^*-h_1h_3^*-h_2^*h_4 & 0 \\ 0 & 2(|h_1|^2+|h_2|^2+|h_3|^2+|h_4|^2) & 0 & -(h_1^*h_3+h_2h_4^*-h_1h_3^*-h_2^*h_4) \\ h_1^*h_3+h_1h_4^*-h_1h_3^*-h_2^*h_4 & 0 & 2(|h_1|^2+|h_2|^2+|h_3|^2+|h_4|^2) & 0 \\ 0 & -(h_1^*h_3+h_2h_4^*-h_1h_3^*-h_2^*h_4) & 0 & 2(|h_1|^2+|h_2|^2+|h_3|^2+|h_4|^2) \end{bmatrix} \quad (8)$$

The space-time decoding is the multiplying of matrix $H^\dagger$ by the received signal. Thus, $H^\dagger H b$ is the result of the space-time decoding. As can be seen from equation (8) when $H^\dagger H$ is multiplied by b then the terms include:

$$2(|h_1|^2+|h_2|^2+|h_3|^2+|h_4|^2)b_1+(h_1*h_3+h_2h_4*-h_1h_3*-h_2*h_4)b_3, \quad (9)$$

$$2(|h_1|^2+|h_2|^2+|h_3|^2+|h_4|^2)b_2+-(h_1*h_3+h_2h_4*-h_1h_3*-h_2*h_4)b_4, \quad (10)$$

$$2(|h_1|^2+|h_2|^2+|h_3|^2+|h_4|^2)b_1+(h_1*h_3+h_2h_4*-h_1h_3*-h_2*h_4)b_3, \quad (11)$$

$$2(|h_1|^2+|h_2|^2+|h_3|^2+|h_4|^2)b_2+-(h_1*h_3+h_2h_4*-h_1h_3*-h_2*h_4)b_4. \quad (12)$$

So, as can seen from (9) and (11) $b_1$ and $b_3$ interfere with each other, while $b_2$ and $b_4$ do not interfere with $b_1$ or $b_3$. Similarly, as can be seen from (10) and (12) $b_2$ and $b_4$ interfere with each other, while $b_1$ and $b_3$ do not interfere with $b_2$ or $b_4$.

The results of matrix multiplier 207 (i.e. the vertical vector f) are then supplied as an input to decoders, which would, as described below, be similar to the decoders 211-1, 211-2, 211-3, and 211-4 shown in FIG. 7. Each of the four entries of vertical vector f is supplied to a respective one of the decoders. The decoding performed by decoders 211-1, 211-2. 211-3, and 211-4 is advantageously the inverse of that performed by encoder/mapper 135. Decoders 211-1, 211-2, 211-3, and 211-4 may also perform the de-mapping. (Note that decoding may be eliminated entirely if coding was not performed by encoder/mapper 135, shown in FIG. 2A. In this case the decoders would still perform the de-mapping.) Note that the decision functionality that is part of the digital demodulation, that is the process that selects the closest constellation point (i.e. the de-mapping process), may be in decoders 211-1, 211-2, 211-3, and 211-4 or in a separate unit whose functionality is performed either before or after the functionality of multiplexer 213. Furthermore, the particular algorithm used to achieve the decision functionality is at discretion of the implementor.

The outputs of decoders 211-1, 211-2, 211-3, and 211-4 are supplied to multiplexer (MUX) 213 which interleaves them in the inverse pattern of DEMUX 130 to reconstruct the symbol stream, forming reconstructed primitive data stream 215.

Receiver 200 arranged in accordance with the principles of the invention, and shown in FIG. 7, operates as described above except, the decision functionality that is part of the digital demodulation de-maps the symbols using the assumption that some of the symbols represent the points of phase-shifted symbol constellations.

The foregoing is merely illustrative and various alternatives will now be discussed. For example, in the illustrative embodiment the system is described as a multiple-input system having 4 transmit antennas and one receive antenna. In alternative embodiment the system can have any number of transmit and receive antennas. For example, the system can have an even number of transmit antennas, such as either 2, 4, 6, 8, 10 transmit antennas, and one receive antenna, or an even number of transmit antennas and multiple receive antennas. In the case where the system is a multiple-input, multiple-output system, where a multiple-input, multiple-output system is one that has multiple antennas at the transmitter and multiple antennas at the receiver, the symbols are reconstructed for each of the received symbol sub-streams developed at each receive antenna in the manner described hereinabove. They may then be combined to develop an improved estimate of the original symbol. Such combination may be achieved, for example, by averaging values for each corresponding symbol.

In the illustrative embodiment the symbol constellations have been described as QPSK symbol constellation. In alternative embodiments, the symbol constellations can be any symbol constellations.

In the illustrative embodiment the system is in use in an environment having flat-faded channels. Those of ordinary skill in the art of non-flat-faded channels will be able to apply the techniques of the invention for use with non-flat-faded channels.

In the illustrative embodiment encoder/mapper 135 performs both the channel coding and the mapping. In alternative embodiments, the functionality of either the channel coding or the mapping can be either omitted or performed either earlier or later in the process. Additionally, although each encoder/mapper is shown as one functional block, they can be implemented as either one or as separate functional blocks, in either hardware or software or a combination of hardware and software.

In the illustrative embodiments the displacement is described as a phase shift. In alternative embodiments the displacement can be any displacement, such as for example an amplitude shift, or a combination of a phase and amplitude shift. In the case the displacement includes an amplitude shift, the amplitude shift can be achieved in any manner, such as for example by multiplying by the same factor each of the points of a particular symbol constellation. The factor by which each of the points is multiplied can be determined in a similar manner as described above for determining the amount of the phase shift.

In the illustrative embodiments the displaced symbol constellation and its respective constellation (the constellation with respect to which the displaced symbol constellation is considered displaced) are phase-shifted versions of each other. In alternative embodiment different constellations can be used to map the different symbols. For example, a QPSK constellation can be used to map $b_1$ and BPSK to produce $b_3$. In which case, the displaced symbol constellation is a different constellation than it respective constellation and the displaced symbol constellation is rotated in the complex plane by a different amount that the amount by which its respective constellation is rotated in the complex plane.

In the illustrative embodiment, the output derivatives of a particular symbol in same transmit matrix represent the points of the same symbol constellation regardless of which symbol period they are to be transmitted, that is regardless of their column in the matrix. In alternative embodiments, the derivatives of a particular symbol in the same transmit matrix can represent the points in one symbol constellation in one time period and the points of a phase-shifted version of this constellation in another time period.

The illustrative embodiments use RF antennas. In alternative embodiments any form of antennas may be employed, e.g., a light source. Furthermore, although radio frequency units are shown in the illustrative embodiments, in other embodiments of the invention, e.g., those using light for communicating the transmitted signal, different modulators and demodulators may be employed.

In the illustrative embodiment, the primitive data stream is divided into a plurality of sub-streams and then processed in a respective encoder/mapper 135-1, 135-2, 135-3, and 135-4. In alternative embodiments, the primitive data stream may be first processed in an encoder/mapper and the resulting symbol stream then divided into a plurality of symbol sub-streams.

The transmitter and receiver embodying the principles of the present invention can be used in various parts of a wireless communication system in addition, or instead of, the ones shown in the illustrative embodiments. For example, the transmitter can be part of a base station and the receiver part of a mobile terminal, and/or vice versa, i.e. the transmitter can be part of the mobile terminal and the receiver part of the base station. Alternatively, the transmitter can be part of a wireless hub of a wireless local area network and the receiver part a terminal of a wireless local area network, such as a laptop, and/or vice versa. Or, each of the transmitter and receiver can be part of a fixed wireless network, for example the transmitter and receiver can be part of a fixed wireless system set up for communication between two buildings.

In the illustrative embodiments where the symbols are phase shifted, they are phase shifted prior to space-time encoding. In alternative embodiments, the symbols can be space-time coded to produce input derivatives and then the input derivatives of a particular symbol are phase shifted to produce the output derivatives of that symbol. The output derivatives of a particular symbol have a phase that differs from that of the particular symbol by a phase of other than 90°, 180°, and 270°.

In the illustrative embodiments where the symbols are phase shifted, the multiplication functionalities of multipliers 150 is shown as being performed outside of the encoder/mappers and of the space-time encoder. In alternative embodiments, this multiplication functionality can be performed as part of the functionality of either the encoder/mappers or of the space time encoder.

The block diagrams presented in the illustrative embodiments represent conceptual views of illustrative circuitry embodying the principles of the invention. Any of the functionally of the illustrative circuitry can be implemented as either a single circuit or as multiple circuits. The functionality of multiple illustrative circuitry can also be implemented as a single circuit. Additionally, one or more of the functionalities of the circuitry represented by the block diagrams may be implemented in software by one skilled in the art with access to the above descriptions of such functionality.

In the illustrative embodiment, the channel coding, mapping, and demultiplexing has been described in a particular order. In alternative embodiments, the order of these operations can be interchanged by one skilled in the art.

The principles of the present invention can be used in a system that employs direct sequence spreading, such as, for example a code division multiple access (CDMA) system. In such a system, space-time encoder 140, 140', 140" further multiplies each element of matrix B by a spreading code sequence represented by c, which spans 1 or more symbol periods and contains N chips, where N is the spreading gain.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, while the invention has been described with reference to a preferred embodiment, it will be understood by those skilled in the art having reference to the specification and drawings that various modifications and alternatives are possible therein without departing from the spirit and scope of the invention.

We claim:

1. A method for use in a transmitter adapted to employ four transmit elements to transmit a source bit stream, the method comprising the steps of:

dividing said source bit stream into L data substreams, L>2;

grouping input derivatives of symbols derived from each of said data substreams to form four input derivative time sequences, one sequence for each transmit element, such that said input derivatives of said symbols are members of the group consisting of:

a negative of one of said symbols, a negative of a complex conjugate of one of said symbols, one of said symbols, a symbol developed by encoding at least one sample of at least one of said data substreams, and an unencoded sample of at least one of said data substreams;

wherein each of said input derivative time sequences spans L symbol periods and includes at least one input derivative of at least one symbol from each of said L data substreams; and at least one of said input derivatives of said symbols is a complex conjugate of one of said symbols; and grouping output derivatives of said input derivative time sequences to form four transmit time sequences, one sequence for each transmit element, such that said output derivatives of said input derivative time sequences are members of the group consisting of:

the input derivative; and a phase-shifted input derivative, where the phase shift is other than 90°, 180°, and 270°;

wherein each of said transmit time sequences spans L symbol periods and includes at least one output derivative of at least one symbol from each of said L data substreams; and at least one of said output derivatives of said symbols is a phase-shifted input derivative, where the phase shift is other than 90°, 180°, and 270°.

2. The method of claim 1, further comprising the stap of channel coding the source bit stream using a channel code.

3. The method of claim 1, wherein:

the grouping input derivatives of the symbols step comprises coding at least the first, a second, a third, and a fourth input symbol to form the input derivative time sequences;

the input derivative time sequences are representable by a matrix;
the symbols in each row of the matrix are the symbols of a respective one of the input derivative time sequences;
the symbols in each column of the matrix represent symbols for transmission during one symbol period;

$$\text{the matrix is} \begin{bmatrix} b'_1 & b''^*_2 & b_3 & b^*_4 \\ b'_2 & -b''^*_1 & -b_4 & b^*_3 \\ b_3 & b^*_4 & -b'_1 & -b''^*_2 \\ b_4 & -b^*_3 & b'_2 & -b''^*_1 \end{bmatrix},$$

where:
$b_1$, $b_2$, $b_3$, and $b_4$ are the symbols,
$b_1^*$, $b_2^*$, $b_3^*$, and $b_4^*$ are complex conjugates of $b_1$, $b_2$, $b_3$, and $b_4$, respectively;
a first subset includes $b_1$, $-b_1$, and $-b_1^*$; and
a second subset includes $b_3$, $b_3^*$, and $-b_3^*$.

4. The method of claim 1, further comprising the step of transmitting each of the input derivative transmit-sequences over a different one of the four transmit elements.

5. The method of claim 1, further comprising the step of displacing in signal space the input derivatives of at least one of the symbols in at least one input derivative transmit-sequence.

6. The method of claim 1, wherein the output derivatives of at least one of the symbols are displaced in signal space.

7. The method of claim 1, wherein the symbols are phase shifted prior to the grouping input derivatives of the symbols step.

8. The method of claim 1, wherein the output derivatives of the one of said symbols represent points in a first symbol constellation and output derivatives of other symbols represent paints of a second symbol constellation, and wherein the two symbol constellations are displaced versions of each other.

9. The method of claim 8, wherein the first symbol constellation is a shifted version of the second symbol constellation.

10. An apparatus adapted to employ four transmit antennas to transmit a source bit stream, comprising:
means for dividing said source bit stream into L data substreams, L>2;
means for grouping input derivatives of symbols derived from each of said data substreams to form four input derivative time sequences, one sequence for each transmit element, such that said input derivatives of said symbols are members of the group consisting of:
a negative of one of said symbols,
a negative of a complex conjugate of one of said symbols,
one of said symbols.
a symbol developed by encoding at least one sample of at least one of said data substreams, and
an unencoded sample of at least one of said data substreams;
wherein each of said input derivative time sequences spans L symbol periods and includes at least one input derivative of at least one symbol from each of said L data substreams; and at least one of said input derivatives of said symbols is a complex conjugate of one of said symbols; and
means for grouping output derivatives of said input derivative time sequences to form four transmit time sequences, one sequence for each transmit element, such that said output derivatives of said input derivative time sequences are members of the group consisting of:
the input derivative; and
a phase-shifted input derivative, where the phase shift is other than 90°, 180°, and 270°;
wherein each of said transmit time sequences spans L symbol periods and includes at least one output derivative of at least one symbol from each of said L data substreams; and at least one of said output derivatives of said symbols is a phase-shifted input derivative, where the phase shift is other than 90°, 180°, and 270°.

11. The apparatus of claim 10, further comprising means for channel coding the source bit stream using a channel code.

12. The apparatus of claim 10, further comprising means for transmitting each of the input derivative transmit-sequences over a different one of the four transmit antennas.

13. The apparatus of claim 10, further comprising means for displacing in signal space the input derivatives of at least one of the symbols in at least one input derivative transmit-sequence.

14. The apparatus of claim 10, wherein the output derivatives of at least one of the symbols are displaced in signal space.

15. The apparatus of claim 10, wherein the symbols are phase shifted prior to the means for grouping input derivatives of the symbols.

16. The apparatus of claim 10, wherein the output derivatives of the one of said symbols represent points in a first symbol constellation and output derivatives of other symbols represent points of a second symbol constellation, and wherein the two symbol constellations are displaced versions of each other.

17. The apparatus of claim 16, wherein the first symbol constellation is a shifted version of the second symbol constellation.

18. The apparatus of claim 10, wherein:
the means for grouping input derivatives of the symbols comprises coding at least the first, a second, a third, and a fourth input symbol to form the input derivative time sequences;
the input derivative time sequences are representable by a matrix;
the symbols in each row of the matrix are the symbols of a respective one of the time sequences;
the symbols in each column of the matrix, represent symbols for transmission during one symbol period;

$$\text{the matrix is} \begin{bmatrix} b'_1 & b''^*_2 & b_3 & b^*_4 \\ b'_2 & -b''^*_1 & -b_4 & b^*_3 \\ b_3 & b^*_4 & -b'_1 & -b''^*_2 \\ b_4 & -b^*_3 & b'_2 & -b''^*_1 \end{bmatrix},$$

where:
$b_1$, $b_2$, $b_3$, and $b_4$ are the symbols,
$b_1^*$, $b_2^*$, $b_3^*$, and $b_4^*$ are complex conjugates of $b_1$, $b_2$, $b_3$, and $b_4$, respectively;
a first subset includes $b_1$, $-b_1$, and $-b_1^*$; and
a second subset includes $b_3$, $b_3^*$, and $-b_3^*$.

19. A transmitter adapted for use with four transmit elements to transmit a source bit stream, comprising:
means for dividing said source bit stream into L data substreams, L>2;

means for grouping input derivatives of symbols derived from each of said data substreams to form four transmit time sequences, each of said time sequences spanning L symbol periods, at least one of said derivatives of said symbols being a complex conjugate of one of said symbols;

means for grouping said time sequences into a matrix, each time sequence being a row of said matrix;

means for grouping output derivatives of said input derivative of symbols to form four transmit time sequences, one sequence for each transmit element, such that said output derivatives of said input derivative of symbols are members of the group consisting of:

the input derivative; and a phase-shifted input derivative, where the phase shift is other than 90°, 180°, and 270°;

wherein each of said transmit time sequences spans L symbol periods and includes at least one output derivative of at least one symbol from each of said L data substreams; and at least one of said output derivatives of said symbols is a phase-shifted input derivative, where the phase shift is other than 90°, 180°, and 270°.

\* \* \* \* \*